(12) United States Patent
Legras et al.

(10) Patent No.: US 12,466,570 B2
(45) Date of Patent: Nov. 11, 2025

(54) AIRCRAFT PROVIDED WITH AN EXHAUST DUCT COUPLED TO A STABILIZATION SYSTEM

(71) Applicant: AIRBUS HELICOPTERS, Marignane (FR)

(72) Inventors: Guillaume Legras, Velaux (FR); Franck Morente, Aix en Provence (FR); Philippe Pinto, Saint-Chamas (FR); Kevin Felmy, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 92 days.

(21) Appl. No.: 18/380,289

(22) Filed: Oct. 16, 2023

(65) Prior Publication Data

US 2024/0150030 A1 May 9, 2024

(30) Foreign Application Priority Data

Nov. 9, 2022 (FR) ...................... 2211666

(51) Int. Cl.
*B64D 33/02* (2006.01)
*B64D 29/08* (2006.01)

(52) U.S. Cl.
CPC .............. *B64D 33/02* (2013.01); *B64D 29/08* (2013.01)

(58) Field of Classification Search
CPC ........ B64D 33/02; B64D 29/08; B64D 33/04; F05D 2220/329; F05D 2230/642;
(Continued)

(56) References Cited

U.S. PATENT DOCUMENTS

| 2,653,585 A | 9/1953 | Wallace |
| 2,846,844 A * | 8/1958 | O'Rourke ............. F02K 1/1238 |
| | | 239/265.41 |

(Continued)

FOREIGN PATENT DOCUMENTS

| EP | 2894099 A1 | 7/2015 |
| EP | 3575219 A1 | 12/2019 |

(Continued)

OTHER PUBLICATIONS

French Search Report forFrench Application No. FR2211666, Completed by the French Patent Office, Dated Jun. 2, 2023, 8 pages.

*Primary Examiner* — Jesse S Bogue
(74) *Attorney, Agent, or Firm* — BROOKS KUSHMAN P.C.

(57) ABSTRACT

An aircraft provided with at least one exhaust duct for discharging gases from an engine. The exhaust duct is partly accommodated in an internal housing of the aircraft, the housing being separated from an external environment situated outside the aircraft by at least one cowl that is able to move in relation to a load-bearing structure of the aircraft. The exhaust duct comprises an exhaust segment passing through a passage of the cowl without touching the cowl. A space separates the exhaust segment from the cowl. The aircraft comprises at least one stabilization system coupled to the exhaust duct, the stabilization system comprising a stiffening ring secured to the exhaust duct and at least one fastening connecting the exhaust duct to the cowl.

20 Claims, 2 Drawing Sheets

(58) Field of Classification Search
CPC ..... F05D 2260/96; B64C 27/04; F01D 25/30; F02K 1/04; F02K 1/80
See application file for complete search history.

(56) References Cited

U.S. PATENT DOCUMENTS

| | | | | |
|---|---|---|---|---|
| 3,146,584 A * | 9/1964 | Smith | ........................ | F02K 1/52 60/770 |
| 3,693,880 A * | 9/1972 | Versaw | ................... | F02K 1/825 60/770 |
| 4,073,440 A * | 2/1978 | Hapke | ........................ | F02K 1/74 239/265.29 |
| 4,215,537 A * | 8/1980 | Hurley | .................... | F02K 1/825 239/265.17 |
| 6,109,562 A * | 8/2000 | Crone | ..................... | F01D 25/30 244/119 |
| 6,732,528 B2 * | 5/2004 | Akagi | ........................ | F23R 3/04 60/757 |
| 8,132,755 B2 * | 3/2012 | Hollimon | .................. | F02C 7/20 244/23 B |
| 8,544,255 B2 * | 10/2013 | Durand | ................... | F02K 1/825 60/39.5 |
| 8,844,863 B2 * | 9/2014 | Piesker | ..................... | F02K 1/80 60/785 |
| 9,052,016 B2 * | 6/2015 | Twelves, Jr. | ............ | F02K 1/805 |
| 9,638,133 B2 * | 5/2017 | Kramer | ................... | F02K 1/822 |
| 10,279,924 B2 * | 5/2019 | Rosado | ................... | B64D 33/04 |
| 10,570,853 B2 * | 2/2020 | Chmielewski | ............ | F02K 3/06 |
| 11,047,308 B2 * | 6/2021 | Curaudeau | ............ | B64D 29/00 |
| 11,187,098 B2 * | 11/2021 | Thomas | ................... | F01D 11/08 |
| 11,788,491 B1 * | 10/2023 | Direnzi | ..................... | F02K 1/80 60/770 |
| 2002/0092948 A1 * | 7/2002 | Dugan | ................... | B64D 33/06 244/53 R |
| 2010/0300661 A1 | 12/2010 | Piesker | | |
| 2014/0047849 A1 * | 2/2014 | Kramer | ................... | F02K 1/82 29/889.22 |
| 2020/0291889 A1 * | 9/2020 | Alloway | ................. | F02K 1/822 |

FOREIGN PATENT DOCUMENTS

| | | |
|---|---|---|
| WO | 9954204 A1 | 10/1999 |
| WO | 2009083074 A1 | 7/2009 |

* cited by examiner

AIRCRAFT PROVIDED WITH AN EXHAUST DUCT COUPLED TO A STABILIZATION SYSTEM

CROSS-REFERENCE TO RELATED APPLICATIONS

This application claims priority to French patent application No. FR 22 11666 filed on Nov. 9, 2022, the disclosure of which is incorporated in its entirety by reference herein.

TECHNICAL FIELD

The present disclosure relates to an aircraft provided with an exhaust duct coupled to a stabilization system that is configured to stabilize the exhaust duct.

BACKGROUND

An aircraft and, for example, a rotorcraft, may comprise an engine that discharges combustion gases through an exhaust nozzle.

The engine is conventionally housed in a compartment of the aircraft referred to as the "engine compartment". The engine compartment may be defined by one or more firewalls and/or at least one cowl.

The aircraft may comprise an exhaust duct that leads from the engine compartment to an environment outside the aircraft. The exhaust duct may be fixed and arranged in a housing delimited by a movable cowl, or indeed a firewall, for example. This exhaust duct locally surrounds the exhaust nozzle. This exhaust duct may allow the combustion gases from the exhaust nozzle of an engine to be mixed with fresh air from the engine compartment and/or to be conveyed to preferred zones. The exhaust nozzle may be described as the primary or main nozzle, and the exhaust duct may be described as the secondary nozzle.

Furthermore, the design of an exhaust duct is complex in particular because of the high temperature of the exhaust gases, in the region of several hundred degrees Celsius, the pressure exerted by these gases on the exhaust duct and vibratory phenomena.

For example, the rotation of a helicopter's main rotor, the operation of an engine and a structure carrying the exhaust duct are sources of vibrations likely to excite an exhaust duct. The movement of the air in the vicinity of the exhaust duct is another source of vibrations for this exhaust duct.

Therefore, an exhaust duct is likely to be deformed during flight as a result of these various stresses, in particular as a result of the thermal stresses, as well as its vibratory and dynamic behavior and the setting of its natural frequency in relation to the frequencies of the excitations to which it is subjected.

Modifying the exhaust duct in order to limit these deformations to which it is subjected may be a relatively challenging operation, in terms of the financial cost, time and indeed the mass. Furthermore, modifying an exhaust duct may have an impact on its environment, and, for example, on the load-bearing structure that needs to carry the exhaust duct.

Document EP 3 575 219 describes a rotorcraft having at least one engine associated with an exhaust duct. The exhaust duct is attached to a fixed structure of the rotorcraft by a mechanism so as to be stabilized statically and following thermal expansion.

Document EP 2 894 099 describes a method for manufacturing an exhaust duct provided with retaining rings.

Documents WO 2009/083074 A1, WO 99/54204 A1 and US 2 653 585 A are also known.

SUMMARY

An object of the present disclosure is thus to propose an aircraft provided with an exhaust duct that cooperates with an innovative stabilization system.

The disclosure relates to an aircraft provided with at least one exhaust duct for discharging gases from an engine, the exhaust duct being partly accommodated in an internal housing of the aircraft, the housing being separated from an external environment situated outside the aircraft by at least one cowl, this cowl being able to move in relation to a load-bearing structure of the aircraft, the exhaust duct comprising an exhaust segment passing through a passage of the cowl without touching the cowl, a space separating the exhaust segment from the cowl.

This aircraft comprises at least one stabilization system coupled to the exhaust duct, the stabilization system comprising a stiffening ring secured to the exhaust duct and at least one fastening connecting the exhaust duct to the cowl.

Therefore, the stabilization system comprises two dissimilar devices that work in synergy to improve, during use, the behavior of the exhaust duct in relation to the stresses to which it is subjected.

A stiffening ring is positioned around the exhaust duct, and against this exhaust duct. In particular, the stiffening ring allows the natural frequency of the exhaust duct to be modified in order to move it away from an excitation frequency. The stiffening ring also allows the exhaust duct to be locally constrained in order to prevent it from being deformed, for example by preventing the exhaust duct from becoming oval. This stiffening ring may be arranged in such a way as to have an acceptable impact on the aerodynamics of the aircraft, and indeed on the ventilation of the housing.

The fastening or fastenings allow the exhaust duct to be fastened to the cowl in order to stabilize this exhaust duct during flight. The fastening or fastenings may be defined so as not to impede the thermal expansion of the exhaust duct during operation, while constraining its movement in the reference frame of the aircraft. The fastening or fastenings may also be defined to allow the exhaust duct to be quickly released from the cowl, thereby allowing the cowl to be opened.

This stabilization system may have a low impact in terms of mass, has no impact on the environment of the exhaust duct apart from the cowl and can be retrofitted to an existing aircraft.

The aircraft may also comprise one or more of the following features in particular, taken individually or in combination.

The stiffening ring may surround the exhaust duct.

The stiffening ring may surround a section of the exhaust duct, i.e., totally, therefore extending 360 degrees around an internal volume of the exhaust duct.

Alternatively, the stiffening ring may extend over an angle of less than 360 degrees around a geometric axis, and therefore around the internal volume. The stiffening ring then only partially surrounds the exhaust duct.

According to one possibility compatible with the preceding possibilities, the stiffening ring may be arranged around the exhaust segment.

The stiffening ring applies pressure to the exhaust duct when this exhaust duct expands under the effect of the temperature of the gases. The pressure applied by the stiffening ring to the exhaust duct may be optimized when the stiffening ring is arranged on the exhaust segment, that is likely to undergo less thermal expansion than an inlet segment of the exhaust duct, for example. Furthermore, the stiffening ring tends to stiffen the exhaust segment, that is likely to be deformed in a conventional exhaust duct.

According to one possibility compatible with the preceding possibilities, the stiffening ring may be arranged at least partially in the external environment.

The impact on the aircraft's aerodynamics is therefore limited. The stiffening ring remains arranged as close as possible to, or indeed on, the segment of the exhaust duct that is likely to be deformed in a conventional exhaust duct.

Alternatively, and depending on requirements, the entire stiffening ring may be arranged in the external environment.

According to one possibility compatible with the preceding possibilities, the stiffening ring may comprise an L-shaped, T-shaped, C-shaped or omega-shaped profile. The omega shape may comprise a substantially flat branch, followed by a substantially C-shaped portion, that may or may not be rounded, that is rotated 90 degrees to the right, and then another substantially flat branch.

Such a profile may be sufficient to adequately modify the behavior of the exhaust duct.

According to one possibility compatible with the preceding possibilities, the stiffening ring may be attached to the exhaust duct by removable stiffening fasteners.

The term "removable" denotes fasteners that can be removed without damaging the stiffening ring and/or the exhaust duct during maintenance.

For example, the stiffening fasteners comprise rivets or the like.

According to one possibility compatible with the preceding possibilities, said at least one fastening may comprise a first support secured to the exhaust duct and a second support secured to the cowl, said at least one fastening comprising a connecting fastener attaching the first support to the second support.

The connecting fastener may be a so-called quick-disconnect fastener. According to examples given by way of illustration, the connecting fastener may comprise a quarter-turn fastener or indeed a DZUS® fastening, for example. An operator can then easily separate the exhaust duct from the cowl.

According to one possibility compatible with the preceding possibilities, said at least one fastening may be arranged at least partially inside said housing.

The entire fastening may be accommodated within the housing or it may extend out of the housing. For example, the abovementioned fastening may be located in the external environment.

According to one possibility compatible with the preceding possibilities, said at least one fastening may be accessible via said space separating the exhaust segment from the cowl.

The dimensions of the space may be larger than the dimensions of a human hand or a tool suitable for opening the fastening.

By way of illustration, the space may have a dimension at least greater than 5 centimeters.

Arranging the exhaust duct in a larger passage of the cowl provides a space that a tool and/or a human hand can fit inside. An operator can insert a hand into the space in order to release the exhaust duct from the cowl, in order to open the cowl, for example.

According to one possibility compatible with the preceding possibilities, said at least one fastening may be adjacent to the stiffening ring.

The fastening or fastenings are as close as possible to the stiffening ring in order to provide fastening points and stiffness in substantially the same place.

At least one fastening may possibly be fastened to the stiffening ring.

The fastening thus connects the exhaust duct to the cowl via the stiffening ring.

Alternatively, the fastening may be fastened directly to the exhaust duct.

According to one possibility compatible with the preceding possibilities, said at least one fastening may comprise several fastenings arranged around the exhaust duct.

The fastenings are thus distributed around the exhaust duct in a uniform or non-uniform manner in order to stabilize the exhaust duct in several regions and along several geometric axes.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
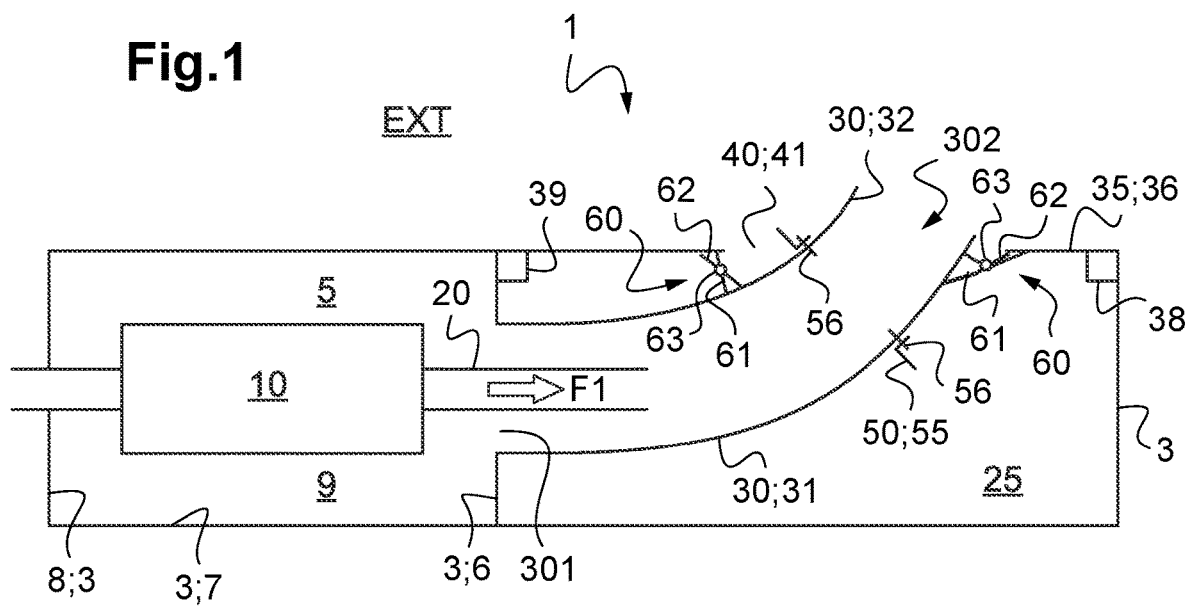
FIG. 1 is a cross-sectional diagram showing an aircraft according to the disclosure.

FIG. 1 shows an aircraft 1 according to the disclosure.

Such an aircraft 1 comprises a load-bearing structure 3 carrying at least one engine 10. The engine 10 is in particular arranged in an engine compartment 5.

The engine compartment 5 is delimited by at least one wall 6, 7, 8, and 9. The wall or walls 6, 7, 8 and 9 may be firewalls, for example being fireproof. For example, the engine compartment 5 is delimited along a longitudinal axis by at least one longitudinal wall 6, 8. For example, the engine compartment 5 is delimited along a transverse axis by at least one transverse wall 7 and a cowling, and vertically at least by a bottom wall 9.

The engine or engines 10 may be heat engines suitable for burning a fuel in order to set each power shaft in motion. According to one possibility, the engine or engines 10 may be turboshaft engines. Alternatively, the engine or engines 10 may be piston engines, for example.

Irrespective of the nature of the engine or engines 10 and their arrangement, each engine 10 comprises an exhaust nozzle 20 for at least discharging gases resulting from the combustion of the fuel in the engine 10 in question in the direction shown by the arrow F1. For example, the exhaust nozzle 20 passes through a longitudinal wall 6.

Therefore, an exhaust duct 30 according to the disclosure at least partially surrounds the exhaust nozzle 20, i.e., the entire exhaust nozzle 20 or a segment of the exhaust nozzle 20 and, for example, at least a discharging portion of the exhaust nozzle 20 through which gases are discharged. For example, the exhaust duct 30 surrounds at least a part of the exhaust nozzle 20 situated outside the engine compartment 5.

The exhaust duct 30 may comprise a peripheral wall. The peripheral wall delimits an internal volume situated inside the exhaust duct 30 and accommodating at least one segment of the exhaust nozzle 20.

Moreover, the exhaust duct 30 extends from an inlet section 301, that may open into the engine compartment 5, to an outlet section 302, that may open onto an environment EXT situated outside the aircraft 1. The air present in the compartment 5 may therefore be sucked into the exhaust duct 30 and is then discharged out of the vehicle with gases from the exhaust nozzle 20, through the outlet section 302.

In particular, the exhaust duct may comprise an inlet segment 31 comprising the inlet section 301, then an exhaust segment 32 comprising the outlet section 302.

Moreover, the exhaust duct 30 is partially accommodated in an internal housing 25 of the aircraft 1.

As shown in FIG. 1, the inlet section of the duct may be fastened to a wall delimiting the housing and, for example, the wall 8.

Except in the event of deformation or vibration, the exhaust duct 30 may be stationary in the reference frame of the aircraft and in the housing 25.

This housing 25 is in particular separated from the external environment EXT at least by a cowl 35. The cowl 35 is able to move in relation to the load-bearing structure 3 of the aircraft 1 and the exhaust duct. To this end, the cowl 35 may be connected to the load-bearing structure 3 by at least one mobility system 38, 39, that is shown schematically. Such a mobility system 38, 39 may comprise at least one rail, at least one slider, or at least one hinge, for example.

Figure 2:
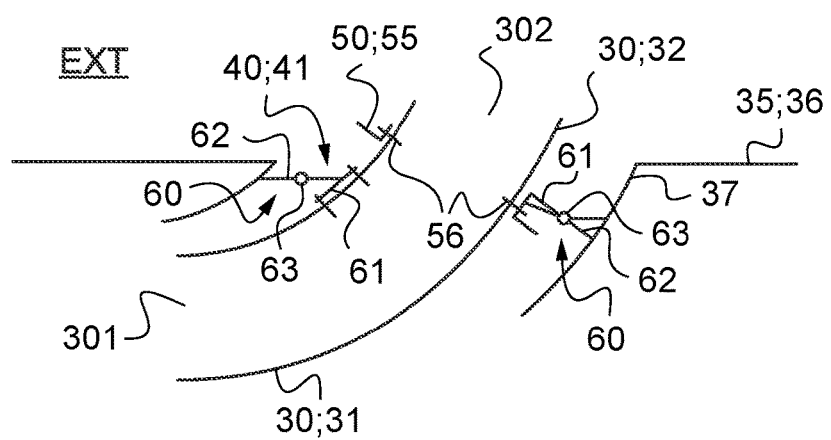
FIG. 2 is a cross-sectional diagram showing an aircraft according to the disclosure.

The cowl 35 may comprise a cowling panel 36. The cowl 35 may comprise a protective casing 37 secured to the cowling panel 36 as shown in FIG. 2 described hereinafter.

Irrespective of the components of the cowl 35 and the mobility systems 38, 39 that allow it to move in relation to the load-bearing structure 3, the cowl 35 comprises a passage 40. Such a passage 40 may comprise a cut-out made in the cowling panel 36, and not obstructed in this case by the protective casing 37.

The exhaust segment 32 of the exhaust duct 30 therefore passes through the passage 40 of the cowl 35 without touching this cowl 35. The exhaust segment can thus extend into the external environment EXT. A space 41 therefore separates the exhaust segment 32 from the cowl 35. This space 41 is an annular space that surrounds the exhaust duct, separating it from an edge delimiting the passage 40.

According to another aspect, the aircraft 1 comprises at least one stabilization system 50 coupled to an exhaust duct 30. When there are several engines 10 and several respective exhaust ducts 30, each exhaust duct 30 is coupled to its own stabilization system 50.

Irrespective of the number of stabilization systems 50, such a stabilization system 50 allows the dynamic and vibratory behavior of the exhaust duct 30 to be modified without stressing the load-bearing structure 3 or the engine compartment 5, for example.

Such a stabilization system 50 comprises a stiffening ring 55 that is attached to the exhaust duct 30. The stiffening ring may completely surround the exhaust duct, i.e., extending 360 degrees around a geometric axis, or may partially surround the exhaust duct.

This stiffening ring 55 is thus secured to the exhaust duct 30.

For example, the stiffening ring 55 is arranged against the exhaust segment 32.

The stiffening ring 55 may possibly be arranged at least partially in the external environment EXT.

According to one variant, the stiffening ring 55 and the exhaust duct 30 form one and the same part, the stiffening ring 55 and the exhaust duct 30 being inseparable from each other without breakage. For example, the stiffening ring 55 is welded to the exhaust duct 30.

According to another variant, the stiffening ring 55 is attached to the exhaust duct 30 by removable stiffening fasteners 56. According to one illustration of this possibility, the stiffening fasteners 56 comprise rivets.

According to another feature, the stiffening ring 55 may have an L-shaped, T-shaped, C-shaped or omega-shaped profile. Such a stiffening ring 55 allows the natural frequency of the exhaust duct 30 to be modified relatively easily and at a lower cost.

Irrespective of the embodiment of the stiffening ring 55, the stabilization system 50 also comprises one or more fastenings 60 connecting the exhaust duct 30 to the cowl 35. At least one fastening 60 may in particular be fastened to the exhaust segment 32. According to the examples shown, the stabilization system 50 comprises several fastenings 60 arranged around the exhaust duct 30.

According to the example of FIG. 1, at least one fastening 60 may in particular be attached to the cowling panel 36 of the cowl 35.

Additionally, or alternatively, and in reference to FIG. 2, at least one fastening 60 may in particular be attached to the protective casing 37 of the cowl 35.

Irrespective of which part of the cowl 35 is attached to a fastening 60, at least one fastening 60 is possibly positioned so as to be adjacent to the stiffening ring 55.

At least one fastening 60 may optionally be fastened to the stiffening ring 55.

Irrespective of the positioning of a fastening 60, this fastening 60 may comprise a first support 61 and a second support 62 that are assembled together by a connecting fastener 63.

For example, the first support 61 is secured to the exhaust duct 30, directly or via the stiffening ring 55. The first support 61 may be fastened to the exhaust duct 30 or to the stiffening ring 55 by screwing, riveting, gluing, welding, etc.

For example, the second support 62 is secured to the cowl 35. The second support 62 may be fastened to the cowl 35 by screwing, riveting, gluing, welding, etc.

Furthermore, the first support 61 may comprise a male or female clevis comprising at least one first hole. Similarly, the second support 62 may comprise a male or female clevis comprising at least one second hole. The connecting fastener 63 then comprises, in particular, a connection passing through the first hole or holes and the second hole or holes.

According to another aspect, a fastening 60 may be located at least partially in the housing 25. For example, the first support 61 of a fastening 60 may extend partly into the external environment EXT, and the second support 62 may be located in the housing 25. According to another alternative optimized from an aerodynamic point of view, the entire fastening 60 is arranged in the housing 25. Alternatively, at least one fastening 60 may be entirely in the external environment EXT.

At least one fastening 60 is possibly accessible to an operator via the space 41.

Figure 3:
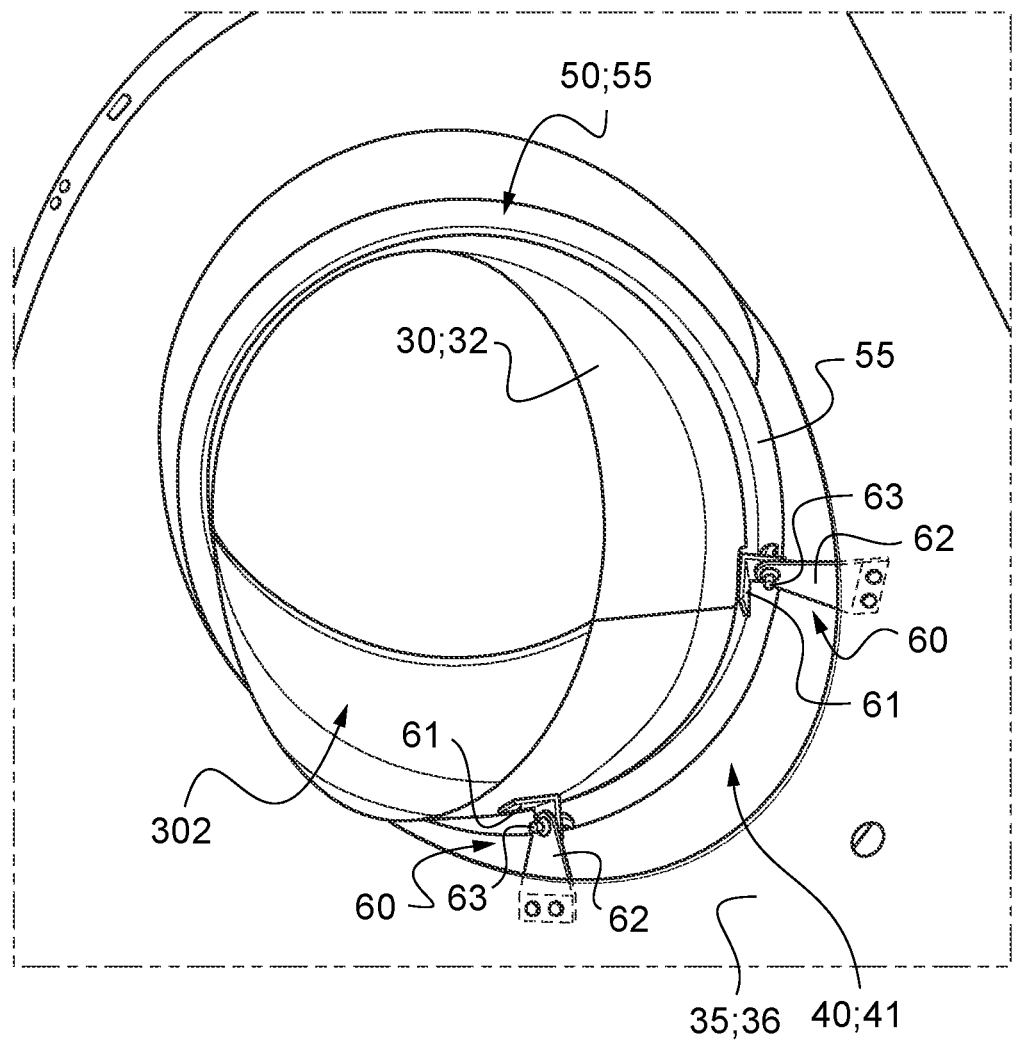
FIG. 3 is a partial view of an aircraft according to the disclosure.

In this context, FIG. 3 shows an embodiment comprising several fastenings 60. The cowl 35 has been rendered locally transparent in order to show the fastenings 60.

Each fastening 60 comprises a first support 61, a second support 62 and a connecting fastener 63. Furthermore, each fastening 60, and in particular its connecting fastener 63, is accessible to an operator via the space 41.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An aircraft provided with at least one exhaust duct for discharging gases from an engine, the exhaust duct being partly accommodated in an internal housing of the aircraft, the housing being separated from an external environment situated outside the aircraft by at least one cowl, the cowl being able to move in relation to a load-bearing structure of the aircraft, the exhaust duct comprising an exhaust segment passing through a passage of the cowl without touching the cowl, a space separating the exhaust segment from the cowl,
   wherein the aircraft comprises at least one stabilization system coupled to the exhaust duct, the stabilization system comprising a stiffening ring secured to the exhaust duct and at least one fastening connecting the exhaust duct to the cowl.

2. The aircraft according to claim 1,
wherein the stiffening ring surrounds the exhaust duct.

3. The aircraft according to claim 1,
wherein the stiffening ring extends over an angle of less than 360 degrees around a geometric axis.

4. The aircraft according to claim 1,
wherein the stiffening ring is arranged around the exhaust segment.

5. The aircraft according to claim 1,
wherein the stiffening ring is arranged at least partially in the external environment.

6. The aircraft according to claim 1,
wherein the stiffening ring comprises an L-shaped, T-shaped, C-shaped or omega-shaped profile.

7. The aircraft according to claim 1,
wherein the stiffening ring is attached to the exhaust duct by removable stiffening fasteners.

8. The aircraft according to claim 1,
wherein the at least one fastening comprises a first support secured to the exhaust duct and a second support secured to the cowl, the at least one fastening comprising a connecting fastener attaching the first support to the second support.

9. The aircraft according to claim 1,
wherein the at least one fastening is arranged at least partially in the housing.

10. The aircraft according to claim 1,
wherein the at least one fastening is accessible via the space separating the exhaust segment from the cowl.

11. The aircraft according to claim 1,
wherein the at least one fastening(s) is adjacent to the stiffening ring.

12. The aircraft according to claim 1,
wherein the at least one fastening is fastened to the stiffening ring.

13. The aircraft according to claim 1,
wherein the at least one fastening comprises several fastenings arranged around the exhaust duct.

14. An aircraft having an exhaust duct for discharging gases from an engine, the exhaust duct partly accommodated in an internal housing of the aircraft, the housing separated from an external environment situated outside the aircraft by a cowl, the cowl moveable in relation to a load-bearing structure of the aircraft, the exhaust duct comprising an exhaust segment passing through a passage of the cowl without touching the cowl such that a space separates the exhaust segment from the cowl,
   wherein the aircraft comprises a ring secured to the exhaust duct and a fastener connecting the exhaust duct to the cowl.

15. The aircraft according to claim 14,
wherein the ring is a stiffening ring that surrounds the exhaust duct.

16. The aircraft according to claim 14,
wherein the ring extends over an angle of less than 360 degrees around a geometric axis.

17. The aircraft according to claim 14,
wherein the ring is arranged around the exhaust segment.

18. The aircraft according to claim 14,
wherein the ring is arranged at least partially in the external environment.

19. The aircraft according to claim 14,
wherein the ring comprises an L-shaped, T-shaped, C-shaped or omega-shaped profile.

20. The aircraft according to claim 14,
wherein the fastener comprises a first support secured to the exhaust duct and a second support secured to the cowl, the fastener attaching the first support to the second support, and wherein the fastener is arranged at least partially in the housing.

* * * * *